Jan. 27, 1948.　　　　G. T. BAKER　　　　2,435,119
HAY FORK
Filed Jan. 2, 1945　　　2 Sheets-Sheet 1
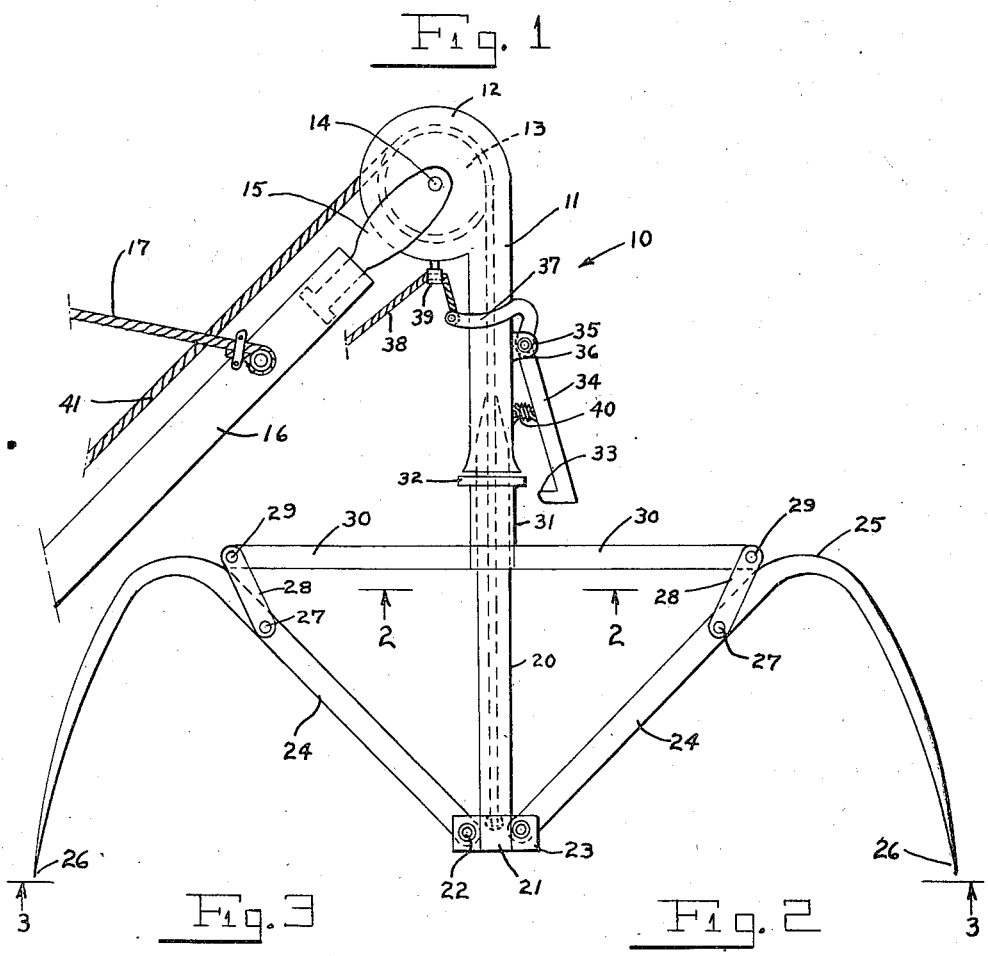
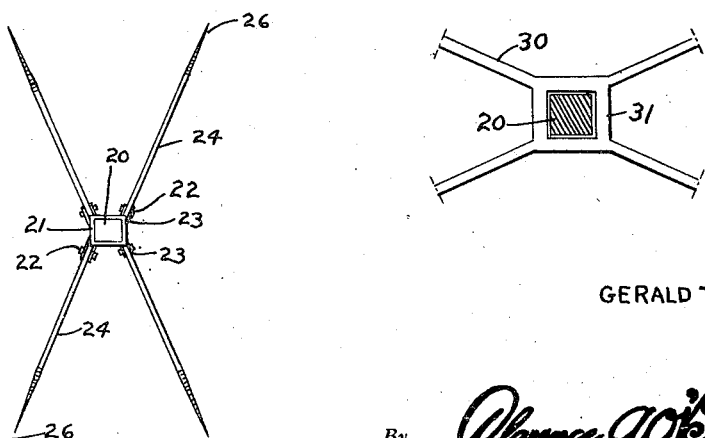
Inventor
GERALD T. BAKER Jan. 27, 1948. G. T. BAKER 2,435,119
HAY FORK
Filed Jan. 2, 1945 2 Sheets-Sheet 2

Inventor
GERALD T. BAKER

Patented Jan. 27, 1948

2,435,119

UNITED STATES PATENT OFFICE 2,435,119

HAY FORK

Gerald T. Baker, Clearwater, Nebr.

Application January 2, 1945, Serial No. 571,046

6 Claims. (Cl. 294—88)

This invention relates to hay fork and more particularly to such a device adapted for the loading and unloading of hay and similar products.

A primary object of this invention is the provision of an improved hay fork, adapted particularly for mounting on a tractor or the like, for movement from place to place, and operated by the motor of said tractor.

An additional object of the invention is the provision of such an improved hay fork which may be advantageously used for stacking hay, for loading hay racks, for filling feed racks, for hauling hay from the stack, or placing it into the hay rack from the stack, or moving loads of hay, feed or the like from place to place.

Still other objects reside in the provision of such a device which will be sturdy and durable in construction, reliable and efficient in operation, and relatively simple and inexpensive to manufacture, install, and operate.

Other objects reside in the combinations of elements, arrangements of parts, and features of construction, all as will be more fully pointed out hereinafter, and disclosed in the accompanying drawings wherein there are shown two preferred embodiments of this inventive concept.

In the drawings:

Figure 1 is a side elevational view, certain parts thereof being indicated by dotted lines, of one form of device embodying the instant inventive concept.

Figure 2 is a sectional view taken substantially along the line 2—2 of Figure 1, showing certain constructional details, other parts thereof being omitted.

Figure 3 is a plan view taken substantially along the line 3—3 of Figure 1.

Similar reference characters refer to similar parts throughout the several views of the drawings.

Figure 4:
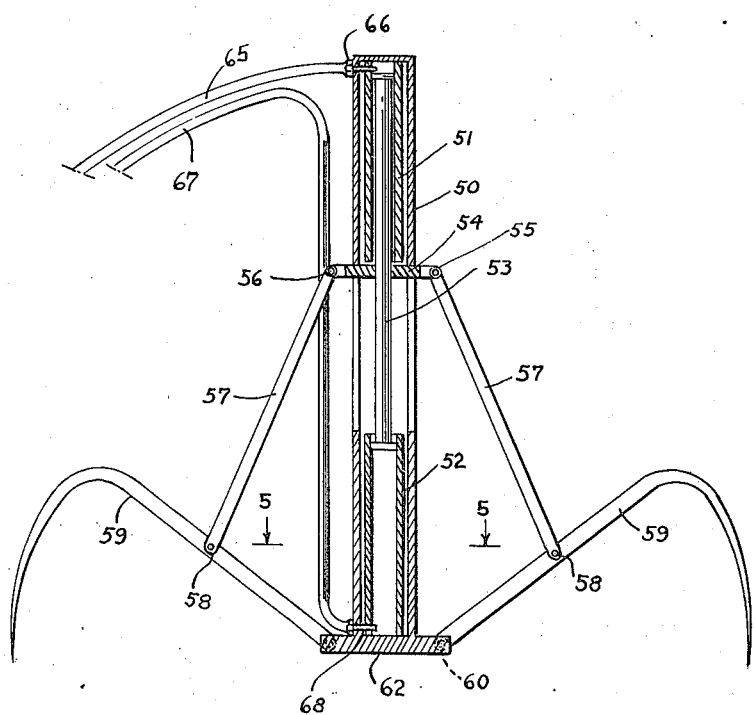
Figure 4 is a side view, partially in section and partially in elevation, of a modified form of construction.

Having reference now to the modification disclosed in Figures 1 to 3 inclusive, there is generally indicated at 10 the hay fork comprising the invention. The device comprises a tubular section 11, terminating in an enlarged upper extremity 12 within which is journaled a pulley 13 mounted on a pin 14 passed through the extremities of a clevis 15. The clevis 15 is secured to a boom 16, the opposite end of which is suitably mounted for pivotal movement on a tractor or the like (not shown); a rope 17 suitably secured adjacent the extremity of the boom 16 is adapted to extend to the winch or the like normally carried by the tractor (not shown) by which the boom may be raised and lowered.

Slidably positioned within the square aperture comprising the interior of tubular member 11 is a square or rectangular rod or bar 20 to the lower extremity of which is secured a block 21. Block 21 has pivotally secured thereto as by means of pivot pins 22 positioned in flanges 23 thereof, extending in angular relation at the corners of the same, a plurality of tines 24 curved as at 25 and terminating in points 26.

Pivotally secured to the tines 24 at a point below the bend 25, as by means of pivot pins 27, are links 28. The opposite ends of links 28 are secured as by means of pivots 29 to arms 30 extending from a block-like member 31, having a square aperture therein adapted to surround the bar or shaft 20.

The upper portion of block member 31 terminates in a flange 32 adapted to be engaged by the lip 33 of a latch member 34 pivotally secured to the member 11 as by a pivot 35 passing through suitable lugs 36 mounted thereon. The other extremity of latch 34 terminates in an angled portion 37 to which is secured a rope or cord 38 passed through an eye 39 integral with or secured to the lower side of the enlarged portion 12 of the member 11. The opposite end of the rope 38 extends to a suitable point adjacent the operator of the device. A spring 40 positioned between the member 11 and the latch 34 serves normally to bias the same to open position in the absence of pressure exerted by the rope 38.

A lifting rope or cable 41 extends from the winch of the tractor over the pulley 13 and is then secured in any suitable manner to the rod 20.

From the foregoing, the operation of the device should be readily understandable. When it is desired to lift a load of hay, the fork being in open position, the rope 38 is pulled closing the latch 33 to engage the flange 32 to hold the fork in open position or the position as shown in Figure 1. Then the device is moved to the hay to be lifted, the latch 33 is released by relaxing the pressure on the rope 38, the spring 40 biasing the same away from the flange 32, and the member 30 drops by the force of gravity, to a point adjacent the block 21, thus permitting the points 26 of the tines 24 to engage a quantity of hay to be lifted.

After the tines have engaged such a quantity of hay force is exerted on the rope 41, which causes the member 20 to slide inwardly within the channel or bore in the member 11, thus raising the block 31 therewith to a point where it may be engaged by the latch 33. As long as the force is exerted on the member 20 by the rope 41, the tines will remain in closed position. However, when it is desired to dump the load of hay or the like, the latch 33 is moved into operative position and the pressure on the rope 41 is released. Thereupon the force of gravity permits the member 20 and its associated mechanism to drop to the position shown in Figure 1, the members 30 and their associated links being retained in a position adjacent the extremity of the member 11, which occasions an opening movement of the tines permitting the dropping of the load.

Figure 5:
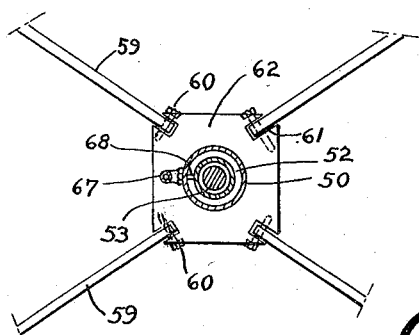
Figure 5 is a sectional view taken substantially along the line 5—5 of Figure 4, certain parts thereof being broken away.

Having reference now to the modifications shown in Figures 4 and 5, there is disclosed a hay fork embodying this inventive concept adapted to be utilized in conjunction with a tractor or the like having a hydraulic lift mechanism associated therewith.

This device is comprised of a suitable cylinder 50 adapted to be secured in any desired manner to the end of a boom (not shown), suitably secured for pivotal movement to a tractor or the like (not shown). Within the cylinder 50 are positioned two oppositely disposed hydraulic sleeves 51 and 52 within which are mounted the opposite extremities of a piston 53, at a mid-point of which is positioned a block or flange 54 provided with extending portions 55 adapted to extend outwardly through suitable slotted apertures in the sleeve 50. Pivotally secured to each of the extensions 55 as by pivots 56 are links 57, the opposite extremities of which are pivotally secured as by pivots 58 to tines 59 similar in configuration to the tines 24. The inner ends of the tines 24 are pivotally secured as by pivots 60 between suitable bifurcations 61 in a block 62 secured to, or integral with, the base of the cylinder 50.

A suitable flexible tube 65 engages an inlet 66 for a hydraulic fluid in the upper extremity of the sleeve 51, and a corresponding flexible tube 67 engages an inlet 68 in the lower extremity of the sleeve 52. From the foregoing the operation of this modification should be readily understandable. Introduction of hydrauilc fluid in any suitable manner from a suitable source thereof (not shown) associated with the tractor through the tubing 65 and the inlet 66 into the sleeve 51 forces the piston 53 downwardly and holds the same securely in downward position, thus forcing the point of the tines 59 inwardly, and securely holding the same within and about a load of hay or the like. Conversely, when it is desired to dump the load, the pressure forcing the fluid through the line 65 may be released and the fluid introduced through the tube 67 and the inlet 68 into the sleeve 52, whereupon the piston 53 is forced upwardly against the pressure of gravity to drop the load and move the tines to the open position shown in Figure 4.

From the foregoing it will now be seen that there is herein provided an improved hay fork adapted to be utilized with any suitable tractor, having either winch or hydraulic means for operating the same associated therewith, which accomplishes all of the objects of this invention and others including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

I claim:

1. In a hay fork in combination, a support, a tine assembly adjustably depending from said support, a carrier having a transverse slot intermediate its ends, alined hydraulic cylinders disposed in said carrier on opposite sides of said transverse slot, pistons joined by a common piston rod reciprocable in said cylinder, a crosshead secured intermediate said piston rod, a plurality of links being pivoted to said cross head, said tine assembly pivoted to said carrier and to said links.

2. In a hay fork in combination, a support, a tine assembly adjustably depending from said support, a carrier having a transverse slot intermediate its ends, alined hydraulic cylinders disposed in said carrier on opposite sides of said transverse slot, pistons joined by a common piston rod reciprocable in said cylinder, a crosshead secured intermediate said piston rod, a plurality of links being pivoted to said crosshead, said tine assembly pivoted to said carrier and to said links, said carrier having closed outer ends and said cylinders constituting annular walls depending from said closed outer ends.

3. In a hay fork in combination, a support, a tine assembly adjustably depending from said support, a carrier having a transverse slot intermediate its ends, alined hydraulic cylinders disposed in said carrier on opposite sides of said transverse slot, pistons joined by a common piston rod reciprocable in said cylinder, a crosshead secured intermediate said piston rod, a plurality of links being pivoted to said crosshead, said tine assembly pivoted to said carrier and to said links, said carrier having closed outer ends and said cylinders constituting annular walls depending from said closed outer ends and being open at their inner ends into said transverse slot.

4. In a hay fork in combination, a support, a tine assembly adjustably depending from said support, a carrier having a transverse slot intermediate its ends, alined hydraulic cylinders disposed in said carrier on opposite sides of said transverse slot, pistons joined by a common piston rod reciprocable in said cylinder, a crosshead secured intermediate said piston rod, a plurality of links being pivoted to said crosshead, said tine assembly pivoted to said carrier and to said links, said carrier having closed outer ends and said cylinders constituting annular walls depending from said closed outer ends, the outward faces of said pistons being alternately operable as power surfaces and the inward faces of said pistons being open to the atmosphere.

5. In a hay fork in combination, a support, a tine assembly adjustably depending from said support, a carrier having a transverse slot intermediate its ends, alined hydraulic cylinders disposed in said carrier on opposite sides of said transverse slot, pistons joined by a common piston rod reciprocable in said cylinder, a crosshead secured intermediate said piston rod, a plurality of links being pivoted to said crosshead, said tine assembly pivoted to said carrier and to said links, said crosshead being guided by the walls of said transverse slot and extending therebeyond, said links being pivoted in slots in said crosshead extending portions.

6. In a hay fork in combination, a support, a tine assembly adjustably depending from said support, a carrier having a transverse slot intermediate its ends, alined hydraulic cylinders disposed in said carrier on opposite sides of said transverse slot, pistons jointed by a common piston rod reciprocable in said cylinder, a crosshead secured intermediate said piston rod, a plurality of links being pivoted to said crosshead, said tine assembly pivoted to said carrier and to said links, said carrier having a flanged base constituting a closed cylinder head, said tine assembly being pivoted in radial slots in said base.

GERALD T. BAKER.

REFERENCES CITED

The following references are of record in the file of this patent:

UNITED STATES PATENTS

| Number | Name | Date |
| --- | --- | --- |
| 247,829 | Johnson | Oct. 4, 1881 |
| 321,158 | Thompson | June 30, 1885 |
| 344,222 | Thomas | June 22, 1886 |
| 1,039,737 | Hester | Oct. 1, 1912 |
| 1,129,664 | Gilchrist et al. | Feb. 23, 1915 |
| 2,227,793 | O'Keeffe | Jan. 7, 1941 |